United States Patent [19]

Ranalli

[11] Patent Number: 5,662,762
[45] Date of Patent: Sep. 2, 1997

[54] LASER-BASED SYSTEM AND METHOD FOR STRIPPING COATINGS FROM SUBSTRATES

[75] Inventor: Ronald J. Ranalli, Caledonia, Mich.

[73] Assignee: Clover Industries, Inc., Grosse Pointe Woods, Mich.

[21] Appl. No.: 499,358

[22] Filed: Jul. 7, 1995

[51] Int. Cl.⁶ .................................................. B32B 35/00
[52] U.S. Cl. ...................... 156/344; 156/584; 219/121.69
[58] Field of Search ............................. 156/94, 344, 584; 219/121.69

[56] References Cited

U.S. PATENT DOCUMENTS

| | | |
|---|---|---|
| 4,329,564 | 5/1982 | Hazelton et al. ................. 219/121.69 |
| 4,554,025 | 11/1985 | Burke et al. . |
| 4,627,197 | 12/1986 | Klee et al. . |
| 4,631,732 | 12/1986 | Christensen . |
| 4,671,848 | 6/1987 | Miller et al. . |
| 4,801,352 | 1/1989 | Piwczyk ........................ 219/121.69 X |
| 5,044,129 | 9/1991 | Olevitch . |
| 5,091,034 | 2/1992 | Hubert . |
| 5,257,706 | 11/1993 | McIntyre ......................... 219/121.69 |
| 5,362,941 | 11/1994 | Johnson et al. ................. 219/121.69 X |
| 5,396,045 | 3/1995 | Opdyke ........................... 219/121.69 |
| 5,424,508 | 6/1995 | Swain et al. .................... 219/121.69 X |

FOREIGN PATENT DOCUMENTS

| | | | |
|---|---|---|---|
| 60-33888 | 2/1985 | Japan | ............... 219/121.69 |
| 6-333910 | 12/1994 | Japan | ............... 219/121.69 |

Primary Examiner—Mark A. Osele
Attorney, Agent, or Firm—Dykema Gossett PLLC

[57] ABSTRACT

A laser-based system and method for stripping a coating from a substrate includes laser apparatus for heating and partially ablating the coating and pressurized gas apparatus for directing a blast of high velocity chilled gas against the heated coating to shatter and strip the coating from the substrate. In one application, the laser-based coating stripping system and method of the present invention is used to strip paint from aluminum aircraft bodies.

15 Claims, 2 Drawing Sheets

LASER-BASED SYSTEM AND METHOD FOR STRIPPING COATINGS FROM SUBSTRATES

FIELD OF THE INVENTION

This invention relates generally to the removal of a coating from a substrate, and more particularly, to the removal of a coating from a substrate by use of a laser beam.

BACKGROUND OF THE INVENTION

Current methods for removing paints and other coatings from a substrate include using volatile organic compounds (VOC's) or acids, manual scraping and sanding or abrasive blasting. Each method is costly in terms of pollution abatement, labor intensity or use of resources. VOC abatement is strictly controlled by the Environmental Protection Agency (EPA) both for pollution control and for possible exposure to toxins. Strict adherence to EPA and Occupational Safety and Health Administration (OSHA) guidelines is costly, time consuming and complicated. Another alternative method used is laser heating by a highly focused laser beam. All the above mentioned methods risk damage or adverse effects to the surface of the substrate. In stripping coatings from large surfaces, such as paint from aircraft bodies, the current methods are costly and damage to the body substrate material is unacceptable. Thus, it becomes desirable to develop a coating stripping system which reduces or eliminates VOC's, reduces the labor and time required for stripping and avoids damage to the substrate.

SUMMARY OF THE INVENTION

The present invention provides a system and method for stripping a coating from a substrate. The system includes laser apparatus operative to direct a laser beam on the coating in a manner to cause rapid heating and partial ablation thereof and pressurized gas apparatus operative to direct a blast of, preferably, chilled gas, such as air, against the heated coating. The blast of gas has a sufficiently high velocity and, preferably, low temperature, to cause the coating to shatter and strip away from the substrate. The laser beam is de-focused to avoid substrate damage by limiting localized heat and preferably has a selected wavelength that maximizes heating of the coating while minimizing heating of the substrate.

The present invention also provides a method for stripping a coating from a substrate including the steps of applying a de-focused laser beam to the coating to heat the coating in a manner to cause at least partial ablation thereof and applying a blast of air to the interface between the coating and the substrate to shatter and strip the coating from the substrate.

These and other features and advantages of the invention will be more fully understood from the following detailed description of the invention taken together with the accompanying drawings.

DETAILED DESCRIPTION OF THE INVENTION

Figure 1:
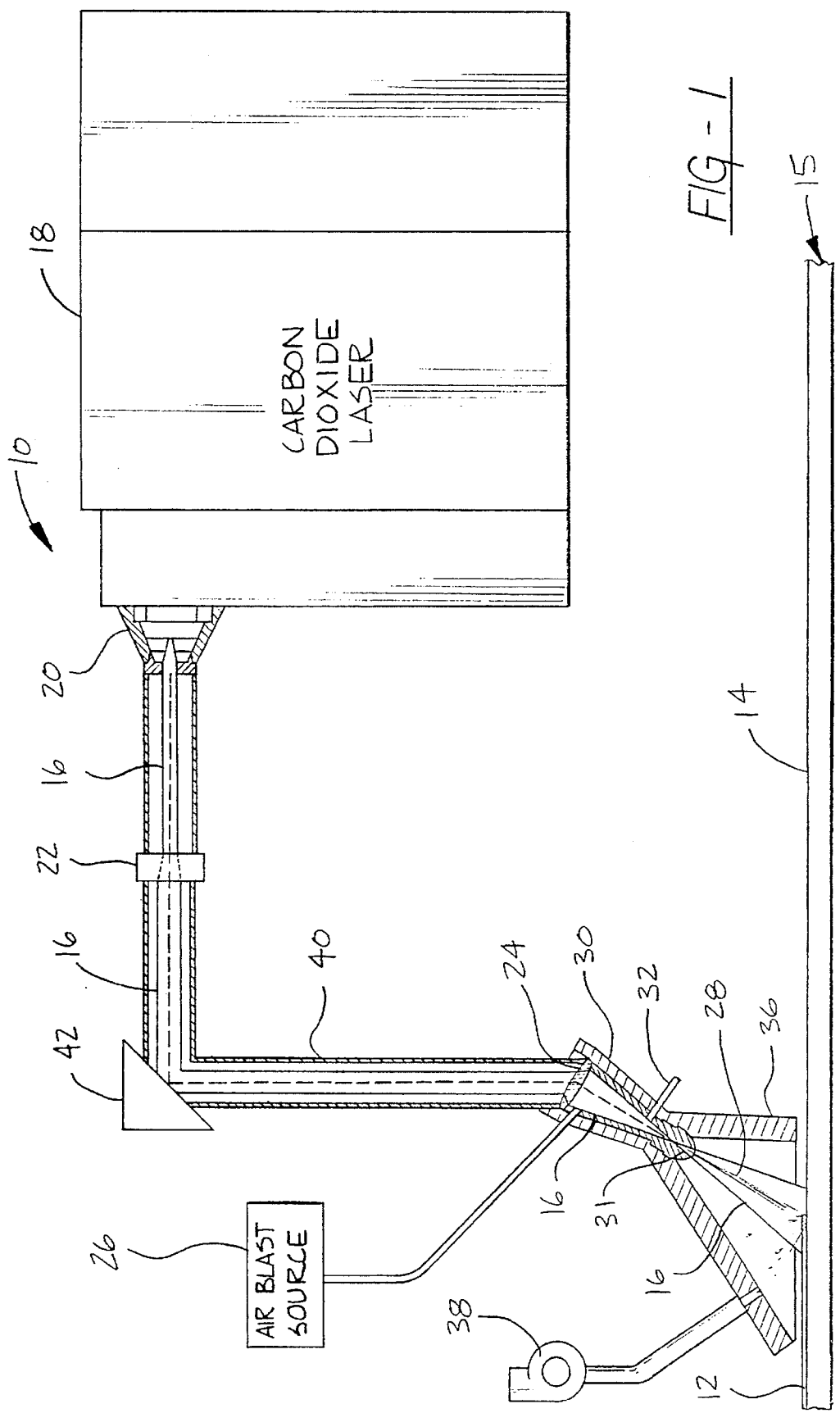
FIG. 1 is a side view of a preferred embodiment of a system for stripping a coating from a substrate according to the invention.
Figure 2:
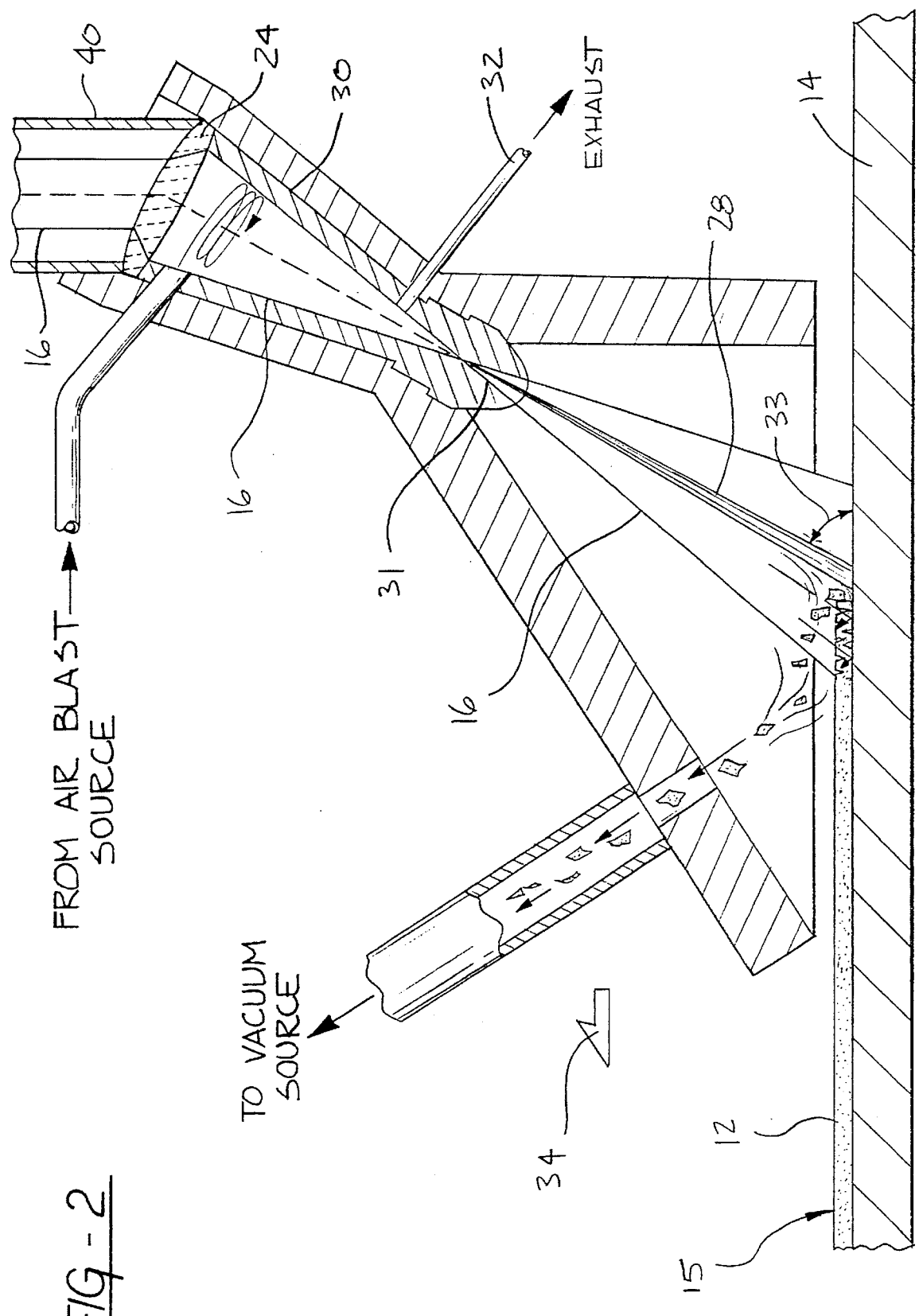
FIG. 2 is an enlarged view illustrating application of a system and method for stripping a coating from a substrate according to the invention.

Referring now to FIGS. 1 and 2 of the drawings in detail, numeral 10 generally indicates a system for stripping a coating 12 from a substrate 14 of a part 15. For example, coating 12 may be a paint and substrate 14 may be a metal.

System 10 includes a laser apparatus operative to direct a laser beam 16 on coating 12 to be stripped in a manner to cause rapid heating and partial ablation of coating 12. The laser apparatus includes a laser 18. Laser 18 is preferably a 3000 Watt continuous wave $CO_2$ (carbon dioxide) laser, such as that manufactured by PRC Corporation of Landing, N.J. Laser beam 16 preferably has a wavelength in the range from 9.5 to 11.8 micrometers. This wavelength range allows for the least absorption of laser beam 16 photons by metallic substrates 14 and the enhanced reflection and refraction of photons into the lattice structure of coating 12. Thus, damage to substrate 14 is thereby avoided. It is preferred that laser 18 be linearly polarized with extremely low optical divergence. It will be appreciated that any good quality continuous gas laser with low beam divergence, good pointing stability and excellent power conditioning may be used within the scope of the present invention.

Laser 18 is tuned into a TEM00 mode to allow an even distribution of the laser's energy which in turn enhances the effects of optics used to direct laser beam 16. Laser 18 includes a power source equipped with power conditioning and grounded against electromagnetic interference (EMI). Laser 18 further includes internal optics such as those provided by II–VI Corporation of Saxonburg, Pa.

System 10 further includes an optical train in the laser apparatus for transporting or transmitting laser beam 16 from laser 18 to coating 12. The optical train comprises an axicon 20 for shaping and/or directing laser beam 16 to conform to the surface of coating 12, an optical upcollimator 22, and a final focusing lens 24. Typically, the diameter of laser beam 16 exiting laser 18 is approximately 0.75 inches. Upcollimator 22 may be used to expand laser beam 16 after it exits axicon 20. The size of laser beam 16 exiting upcollimator 22 is related to the size of part 15 or a path on the part to be stripped and to the power density required. Final focusing lens 24 focuses laser beam 16 above the surface of coating 12 so that laser beam 16 is delivered to the surface of coating 12 in a de-focused state. The purpose of delivering a de-focused laser beam 16 to coating 12 is to decrease, or limit, the density of power delivered to the lattice structure of coating 12 and thereby minimize heating of substrate 14. As the de-focused laser beam 16 is delivered to coating 12, its lattice structure begins to disassociate, or ablate, leaving fractures therein.

All optical train components are preferably water-cooled to minimize spherical aberration and increase the usable life of the optics. The optical train may include one or more rail mounts for adjusting the optics. For example, rail mounts could comprise open-framed, piezo-electric devices, such as those manufactured by Lambda-Physik of Gottingen, Germany.

System 10 further includes a pressurized gas apparatus that includes a pressurized gas source 26 and is operative to direct a blast or high velocity stream of gas 28 against the heated and partially ablated coating 12. Preferably, the pressurized gas is compressed oil-free air at a pressure of 80 to 90 psi that is driven against the coating 12 with high velocity at a rate of two to five cubic feet per minute. The gas apparatus includes at least one venturi-vortex nozzle 30 for simultaneously applying the blast of gas 28 and laser beam 16 to coating 12. The size of nozzle 30 selected is matched to the size and shape of part 15. Nozzle 30 is a venturi having an opening 31 large enough to allow laser beam 16 and a jet of gas 28 to pass therethrough.

High velocity air from the gas apparatus is injected into nozzle 30 beneath lens 24 at an angle of six to fifteen degrees normal to the bottom plane of lens 24. Nozzle 30 centrifuges the flow of high velocity air, and removes any liquid in the air via vaporization to split the air into a superheated component (air containing liquid) and a superchilled component (air without liquid) having a temperature below ambient. The superheated component of air is exhausted from nozzle 30 through an exhaust opening 32. The superchilled component exits nozzle 30 via opening 31 having a vortex or swirling flow. The superchilled component of air blast 28 is directed at the interface of the paint or coating 12 and the substrate 14 so that the superchilled component of air blast 28 intersects the surface of coating 12 at an oblique angle 33. The angle 33 is selected or adjusted by testing to obtain the best stripping action from the air blast against the particular coating based upon its thickness and other pertinent characteristics.

The superchilled component of air blast 28 is contained within the boundaries or outer edge of the laser beam 16. As nozzle 30 moves in the direction of arrow 34 relative to part 15, the de-focused laser beam 16 first heats the coating. The air blast 28 then cools coating 12 since the temperature of air blast 28 is much lower than the temperature of the laser heated coating 12.

Thus, a temperature gradient is created between the laser heated coating 12 and the superchilled component of air blast 28, causing coating 12 to shatter so that the ablation process may be completed. The temperature gradient acts to shock or disrupt the mechanical bond between coating 12 and substrate 14. This bond is then open to fracturing via the propagation of cracks in the lattice structure caused by the incomplete absorption of laser beam 16 photons at the surface of the coating 12. Air blast 28 has a velocity sufficient to peel coating 12 from substrate 14 to complete the ablation process. A portion of the laser beam 16 which trails behind the air blast 28 continues to heat coating particles that may enter this area and avoids their redeposition upon the substrate.

With the wavelength of laser beam 16 being in the range from 9.5 to 11.8 micrometers, a metallic substrate 14 refracts and/or reflects toward coating 12 approximately 90 to 95% of the energy reaching the substrate from laser beam, thereby minimizing heating of and avoiding damage to substrate 14 while maximizing heating of coating 12.

Focusing lens 24 is positioned within nozzle 30 and focuses laser beam 16 approximately on opening 31. In a specific embodiment, lens 24 has a 17.5 inch effective focal length with a negative meniscus surface. The distance from opening 31 of nozzle 30 to the surface of part 15 is fixed preferably within a range from a minimum of 0.5 inches to a maximum of 4.75 inches. The distance from nozzle 30 to the surface of part 15 is kept constant as the nozzle 30 moves along part 15 guided, for example, by a part surface conforming mount such as that manufactured by Schneeberger of Lexington, Mass. Thus, laser beam 16 reaches coating 12 in a de-focused state as focusing lens 24 acts to spread laser beam 16. In this manner, a Uniform power density is provided to coating 12 to heat the coating sufficiently to cause ablation of the coating while avoiding excessive heating of substrate 14. Focusing lens 24 is moveable relative to coated part 15 toward and away therefrom. Although not shown, a servomotor, such as that manufactured by the Parker-Hannifin Corporation of Dayton, Ohio may be used to move lens 24.

System 10 further includes a flow shield/vacuum shield 36 for trapping any peeled coating chips as coating 12 is stripped from substrate 14. A standard 3.5 horsepower reverse blower or vacuum 38 may be used to extract and collect any coating chips trapped by shield 36.

System 10 further includes a laser protective or laser isolating tube 40 surrounding laser beam 16 for preventing contamination of the laser beam. Tube 40 comprises one or more black oxide treated tubes which telescope inside each other via Teflon seals. Oil-free air or bottled N2 set at two pounds per square inch is injected into tube 40 to prevent outside contaminants from entering tube 40. As an alternative to isolating tube 40, a laser 18 may include a high speed shutter moveable to open and closed positions for preventing contamination of laser 18. Additionally, an air curtain can be used to prevent contamination of laser 18 when the shutter is in the open position.

System 10 further includes at least one mirror 42 in the laser apparatus. Mirror 42 is of the low phase shift variety such as those manufactured by II–VI Corporation of Saxonburg, Pa. Mirror 42 must be water cooled and isolated from mechanical vibration. Mirror 42 is used to center laser beam 16 in opening 31 of nozzle 30 via lens 24. Mirror 42 is provided with a centering mechanism (not shown) for moving mirror 42 relative to tube 40.

System 10 may include a multi-axis motion system for moving laser beam 16 and air blast 28 relative to part 15. The motion system may comprise an overhead gantry system for moving the laser apparatus relative to part 15. Although an overhead gantry motion system is preferred, a rapid scanner may be used in its place. The scanner may be customized to fit virtually any shape and gives the advantage of spreading the beam over a wide or multi-dimensional area.

FIG. 2 also illustrates a method for stripping a coating 12 from a substrate 14 according to the present invention. The method includes applying a de-focused laser beam 16 to coating 12 to cause heating of coating 12 in a manner to cause ablation thereof and applying a blast of air 28 or other gas from a compressed gas source 26 to the interface between the coating 12 and substrate 14 to shatter and strip the coating from substrate 14. The laser beam 16 has a wavelength in the range of from 9.5 to 11.8 micrometers and a width greater than 0.75 inches to maximize heating of the coating 12 while minimizing heating of the substrate 14.

The step of applying a blast of air 28 preferably includes the step of chilling the air blast 28 by passing air blast 28 through a venturi nozzle 30 so as to create a large temperature gradient between air blast 28 and the heated coating 12. The blast of air 28 is applied at an angle 33 oblique to the coating 12. A vacuum is applied to collect shattered coating particles stripped by air blast 28.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A system for stripping a coating from a substrate, said system characterized by;

laser apparatus operative to direct a laser beam on the coating to be stripped in a manner to cause rapid heating and partial ablation thereof;

pressurized gas apparatus operative to direct a blast of gas against the heated and partially ablated coating;

said blast of gas having below ambient temperature and sufficiently high velocity to cause the coating to shatter and strip away from the substrate:

said gas apparatus including at least one nozzle for directing said blast of gas against the coating and the substrate at an angle oblique to the coating; and said nozzle being a venturi for generating a vortex flow of gas and splitting said flow of gas into a superheated component directed away from the coating and substrate and a superchilled component of gas directed at the coating and the substrate.

2. The system as in claim 1 characterized in that said laser beam is de-focused to provide a uniform power density to the coating in a manner to cause heating and ablation of the coating while avoiding excessive heating of the substrate.

3. The system as in claim 2 characterized in that said laser beam has a selected wavelength that maximizes heating of the coating while minimizing heating of the substrate.

4. The system as in claim 3 characterized in that said selected wavelength is within a range of from 9.5 to 11.8 micrometers.

5. The system as in claim 1 characterized in that said gas apparatus includes a compressed air source operatively coupled to said nozzle for supplying air to said nozzle.

6. The system as in claim 1 characterized in that said laser apparatus includes:

a carbon dioxide laser;

an axicon for shaping said laser beam after exiting said laser;

upcollimator for expanding the size of said laser beam;

a low phase shift bending mirror for directing said laser beam;

a focusing lens for focusing said laser beam; and a laser beam focal axis adjustment mechanism for moving said focusing lens toward and away from the substrate.

7. The system as in claim 6 characterized by isolating tubes surrounding said laser beam for preventing contamination of said laser beam.

8. The system as in claim 1 characterized by:

a shield for containing coating removed by said air blast; and a vacuum source operatively associated with said shield for collecting shattered coating particles stripped by said air blast.

9. A method for stripping a coating from a substrate, said method including the steps of:

applying a de-focused laser beam to the coating to cause heating of the coating in a manner to cause at least partial ablation thereof; and directing a blast of gas through a venturi of a nozzle against the coating and the substrate at an angle oblique to the coating to shatter and strip the coating from the substrate whereby the venturi generates a vortex flow of gas splitting the flow of gas into a superheated component directed away from the coating and substrate and a superchilled component of gas directed at the coating and the substrate.

10. The method as in claim 9 characterized by chilling the gas before application to the interface between the coating and the substrate so as to create a temperature gradient between the gas blast and the coating.

11. The method as in claim 9 characterized in that the laser beam has a wavelength in the range of 9.5 to 11.8 micrometers to maximize heating of the coating while minimizing heating of the substrate.

12. The method as in claim 9 characterized in that the laser beam has a width greater than 0.75 inches.

13. The method as in claim 9 characterized by applying a vacuum to collect shattered coating particles stripped by the air blast.

14. The method as in claim 9 characterized in that said gas is compressed air.

15. An apparatus for stripping a coating from a substrate comprising:

(a) a laser apparatus for generating a laser beam;

(b) a pressurized gas apparatus including a nozzle having a venturi for directing a blast of gas;

(c) means for directing the laser beam from said laser apparatus through said nozzle and venturi on the coating to be stripped to cause rapid heating and partial ablation thereof; and (d) means for directing the blast of gas from said pressurized gas apparatus through said nozzle and venturi against the heated and partially ablated coating and the substrate to cause the coating to shatter and strip away from the substrate.

\* \* \* \* \*